Figure 1:
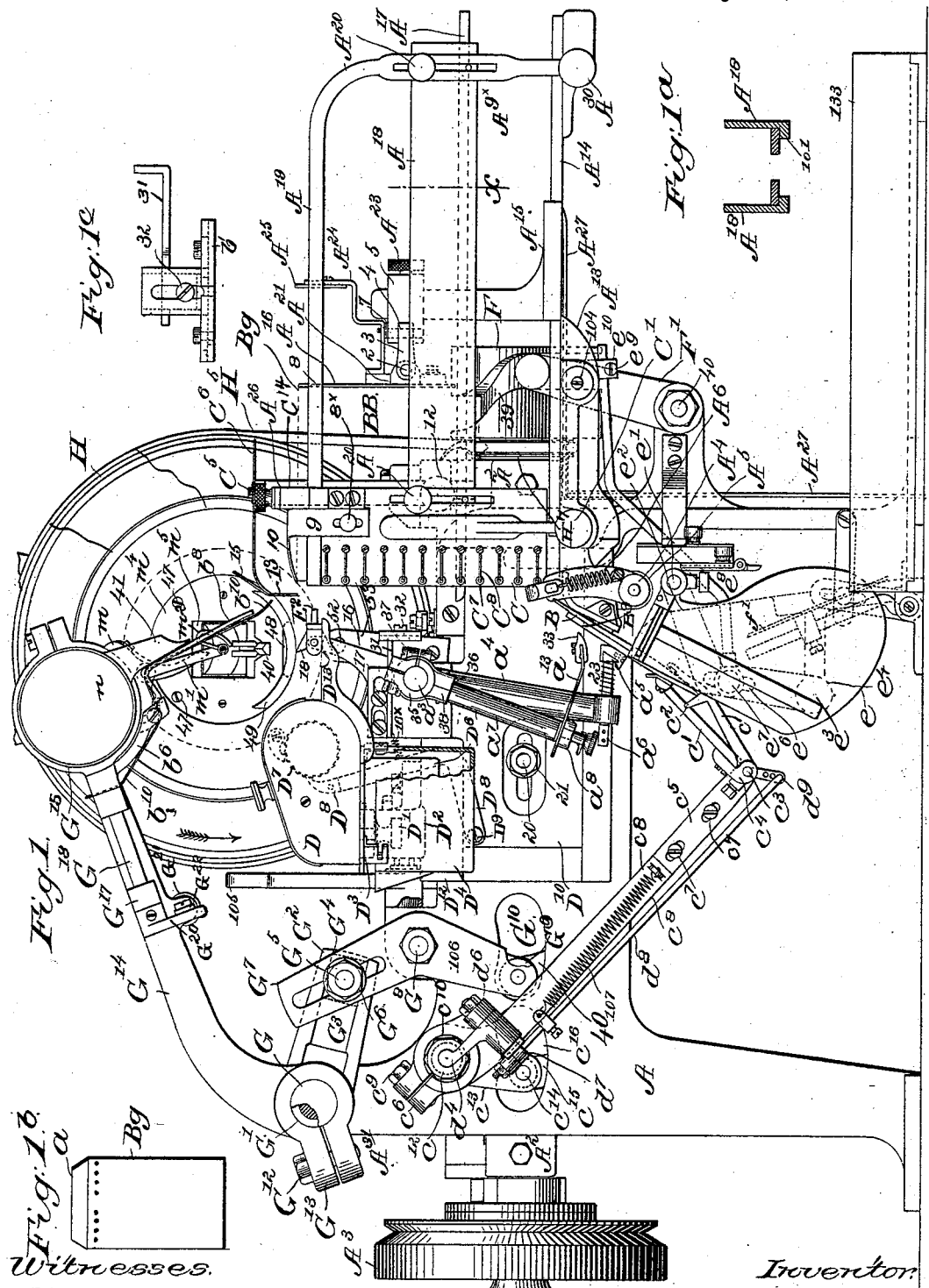

(No Model.) 9 Sheets—Sheet 1.

H. H. CUMMINGS.
BAG FILLING MACHINE.

No. 539,171. Patented May 14, 1895.

Witnesses.
Fred S. Greenleaf.
Edward F. Allen.

Inventor:
Henry H. Cummings.
by Crosby & Gregory attys.

THE NORRIS PETERS CO., PHOTO-LITHO., WASHINGTON, D. C.

(No Model.) 9 Sheets—Sheet 3.
H. H. CUMMINGS.
BAG FILLING MACHINE.
No. 539,171. Patented May 14, 1895.
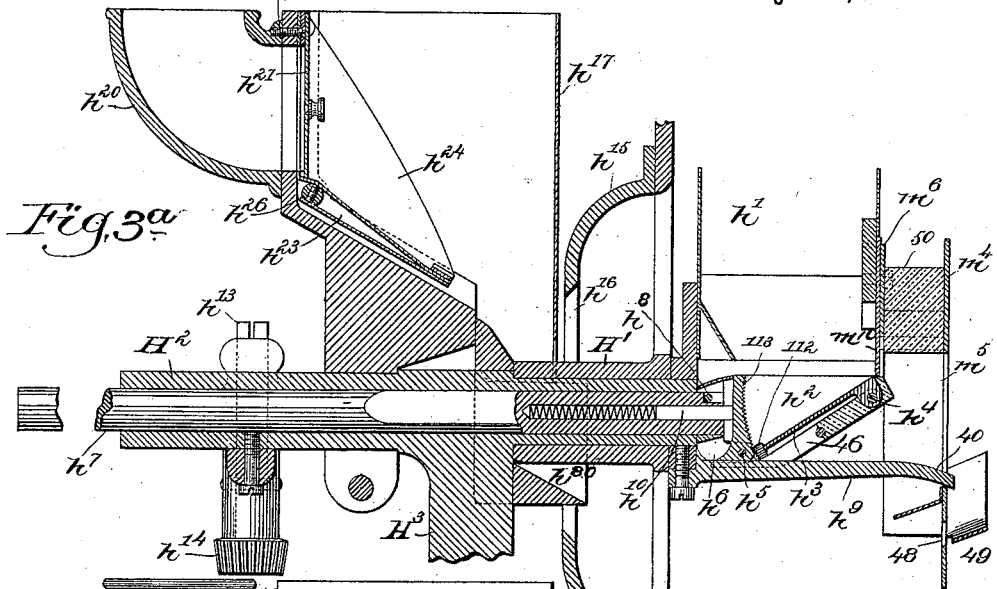
Fig. 3ᵃ
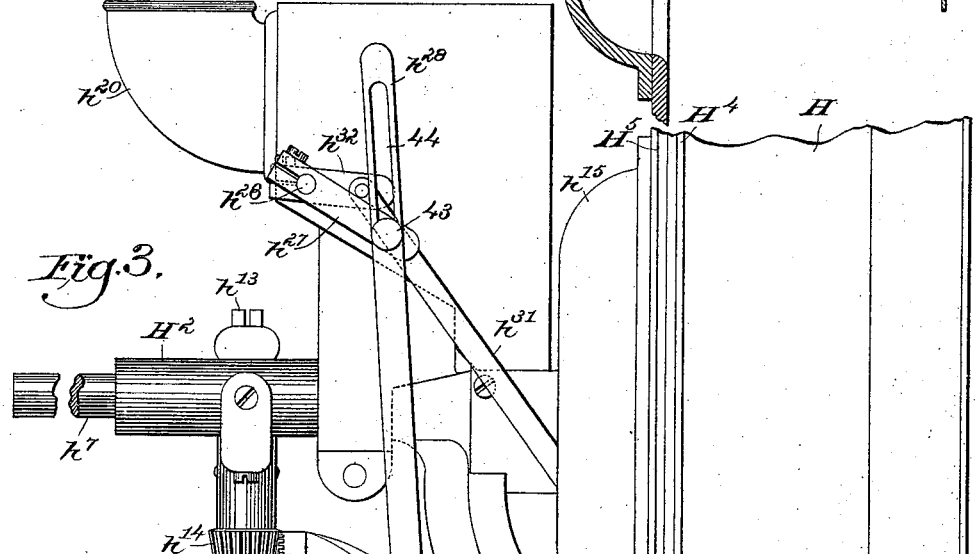
Fig. 3.
Fig. 4.
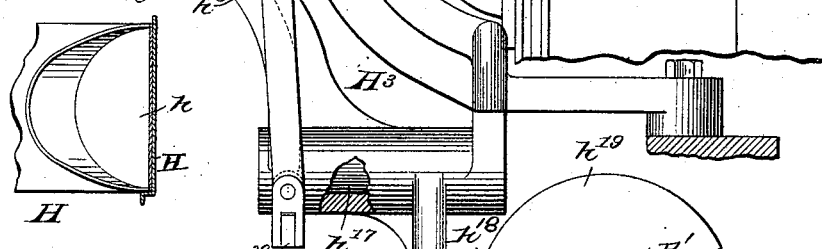
Witnesses
Fred S. Greenleaf.
Edward F. Allen.
Inventor
Henry H. Cummings
by Crosby & Gregory
Attys

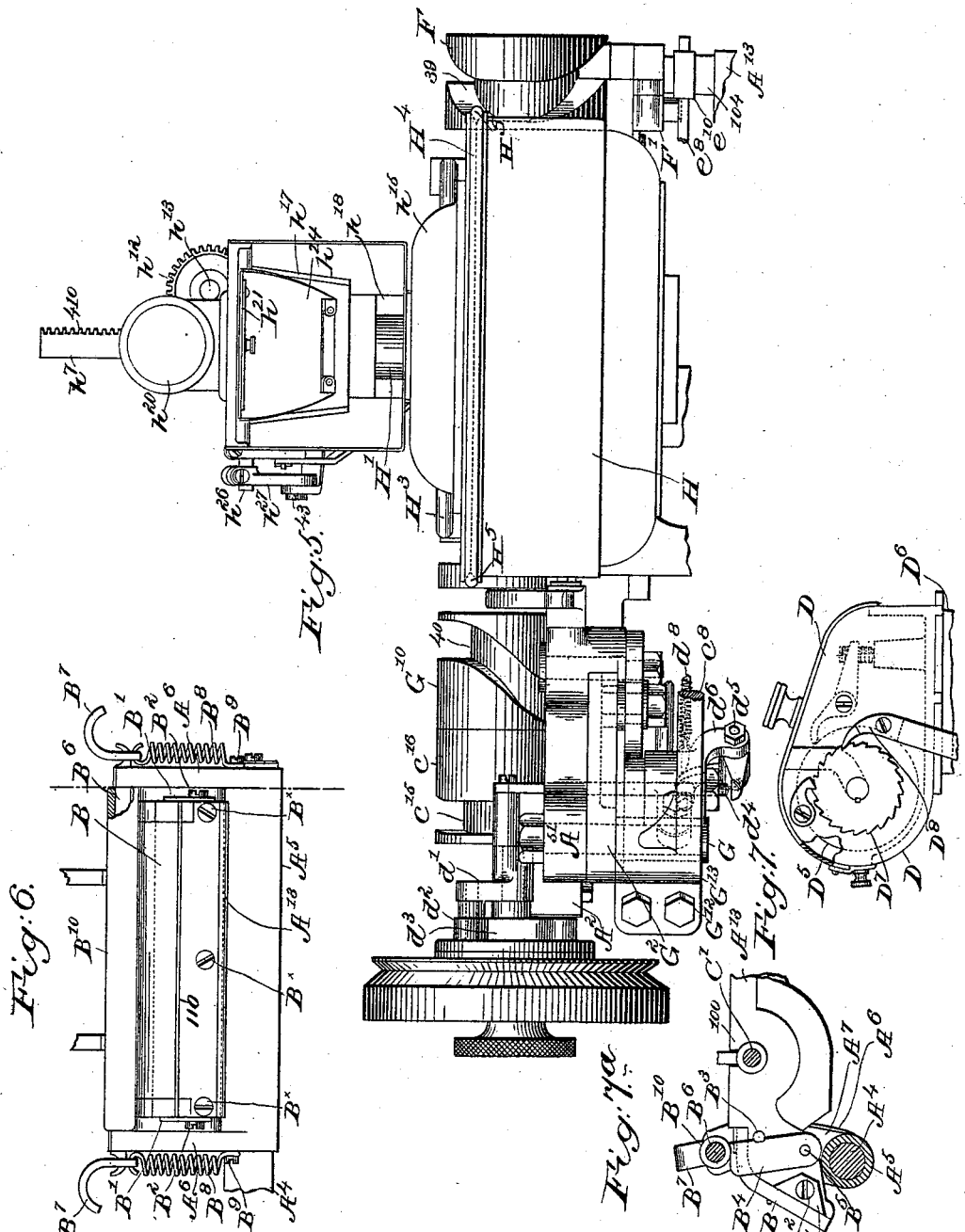

(No Model.) 9 Sheets—Sheet 5.
H. H. CUMMINGS.
BAG FILLING MACHINE.
No. 539,171. Patented May 14, 1895.
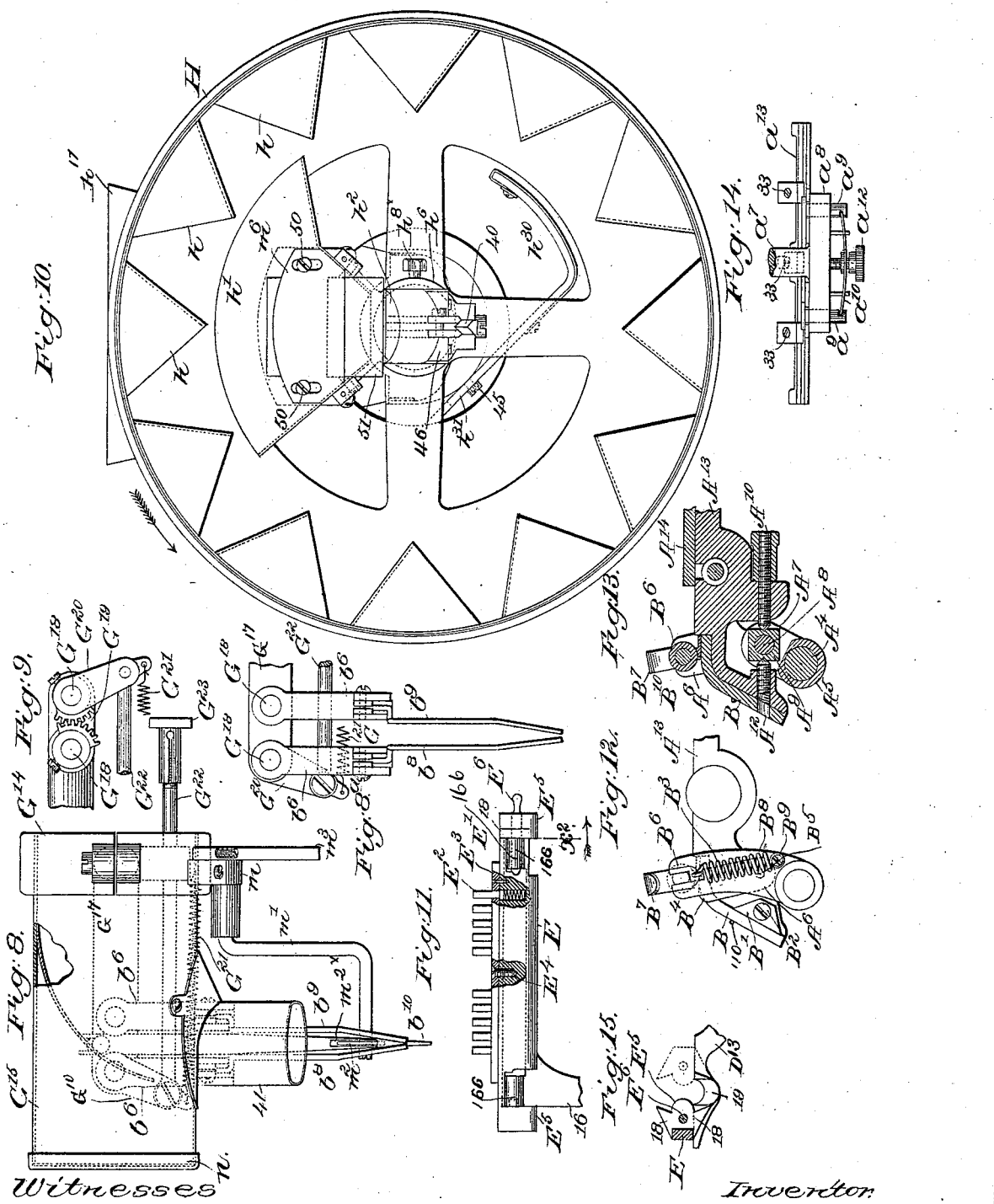
Witnesses
Fred S. Greenleaf.
Edward F. Allen.
Inventor
Henry H. Cummings.
by Crosby & Gregory attys.

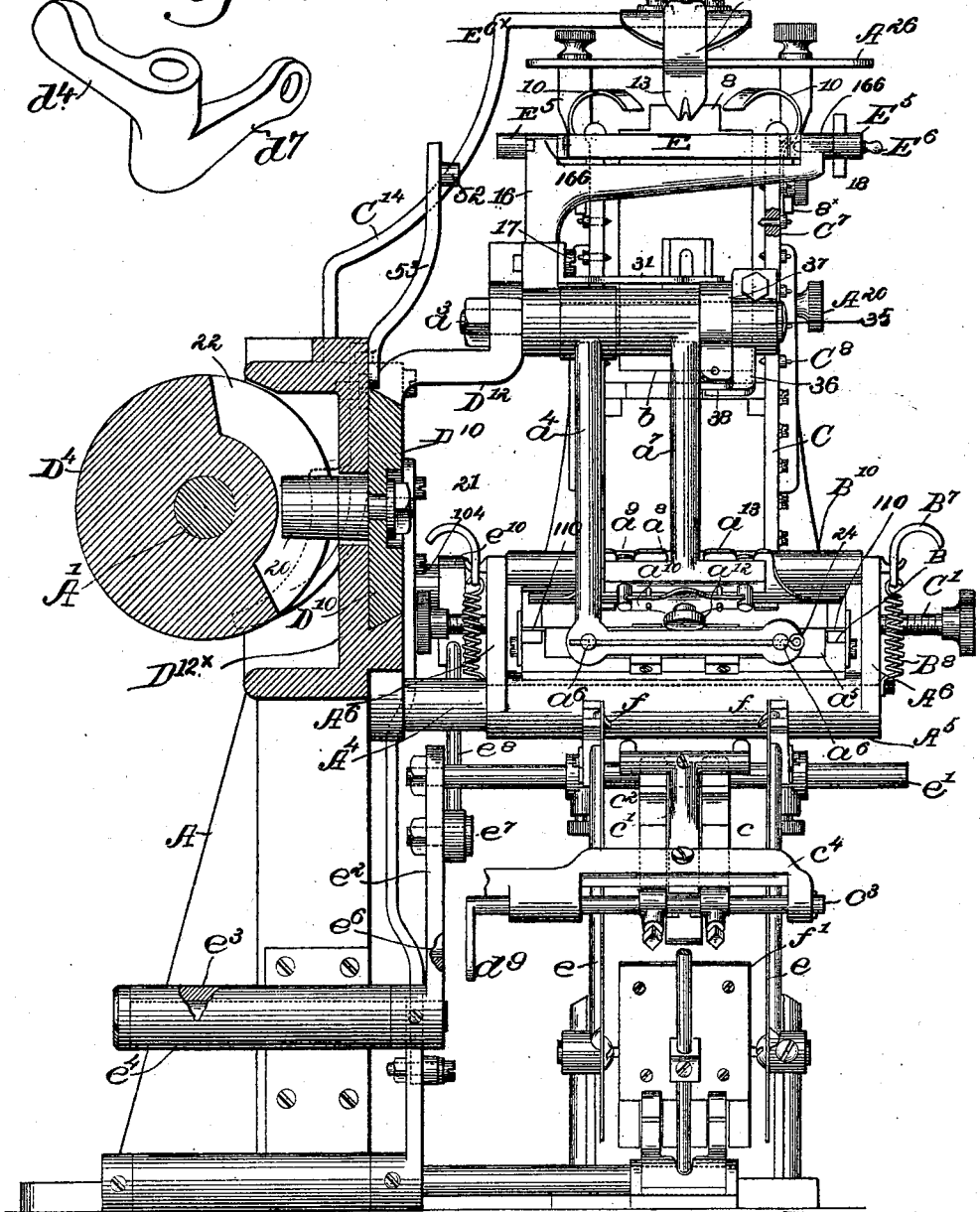

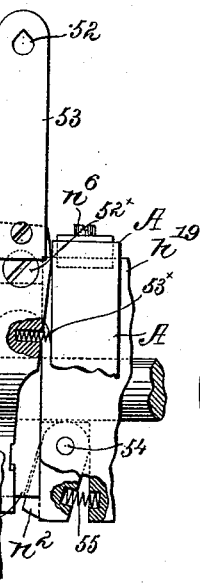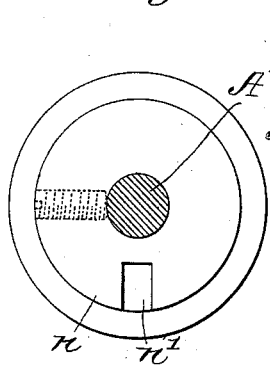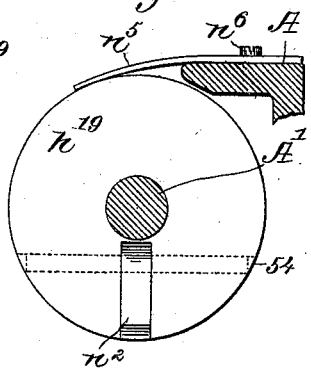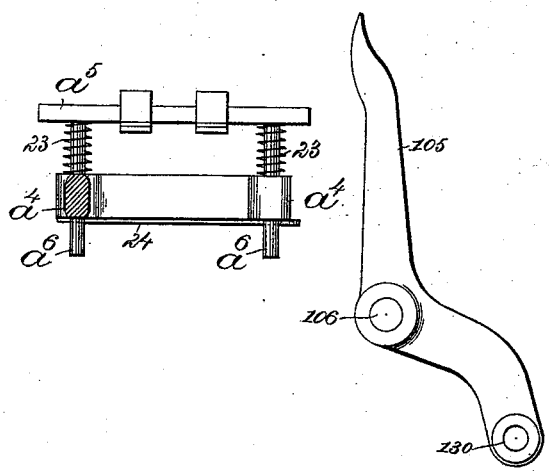

(No Model.) 9 Sheets—Sheet 8.
H. H. CUMMINGS.
BAG FILLING MACHINE.
No. 539,171. Patented May 14, 1895.
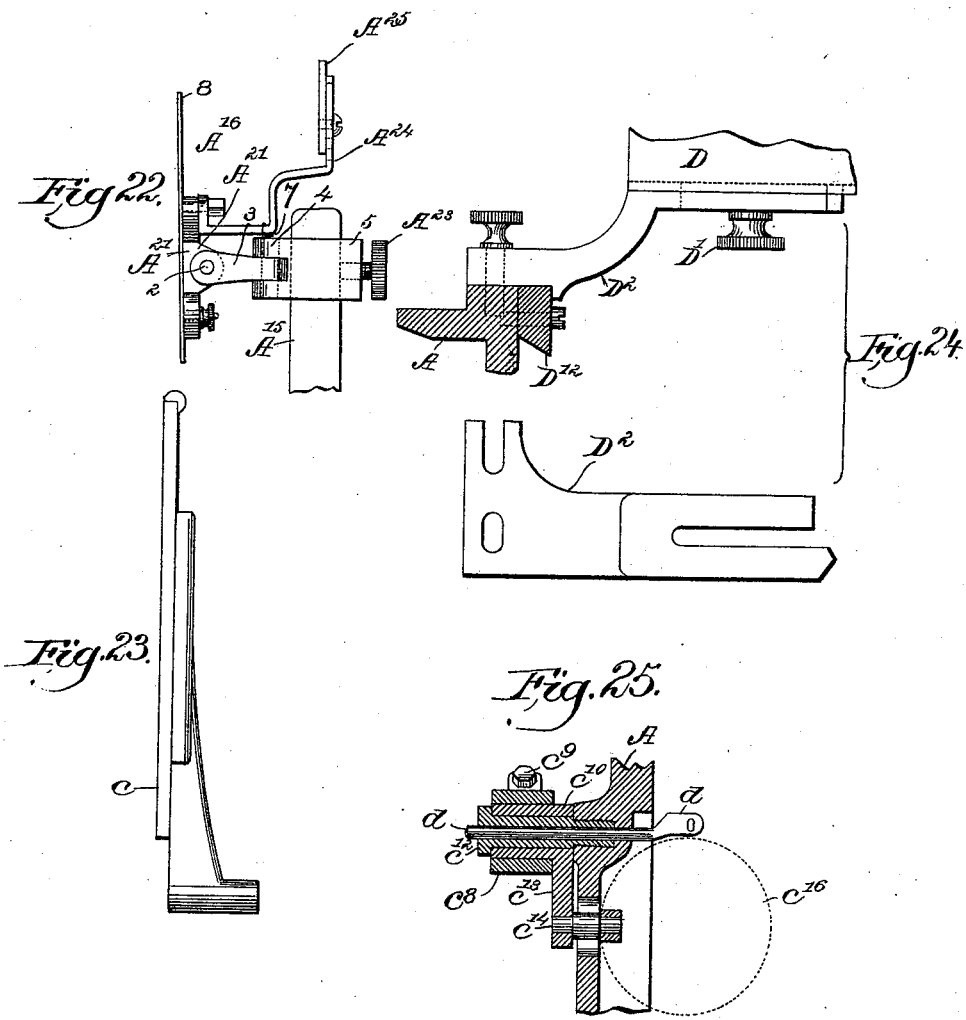

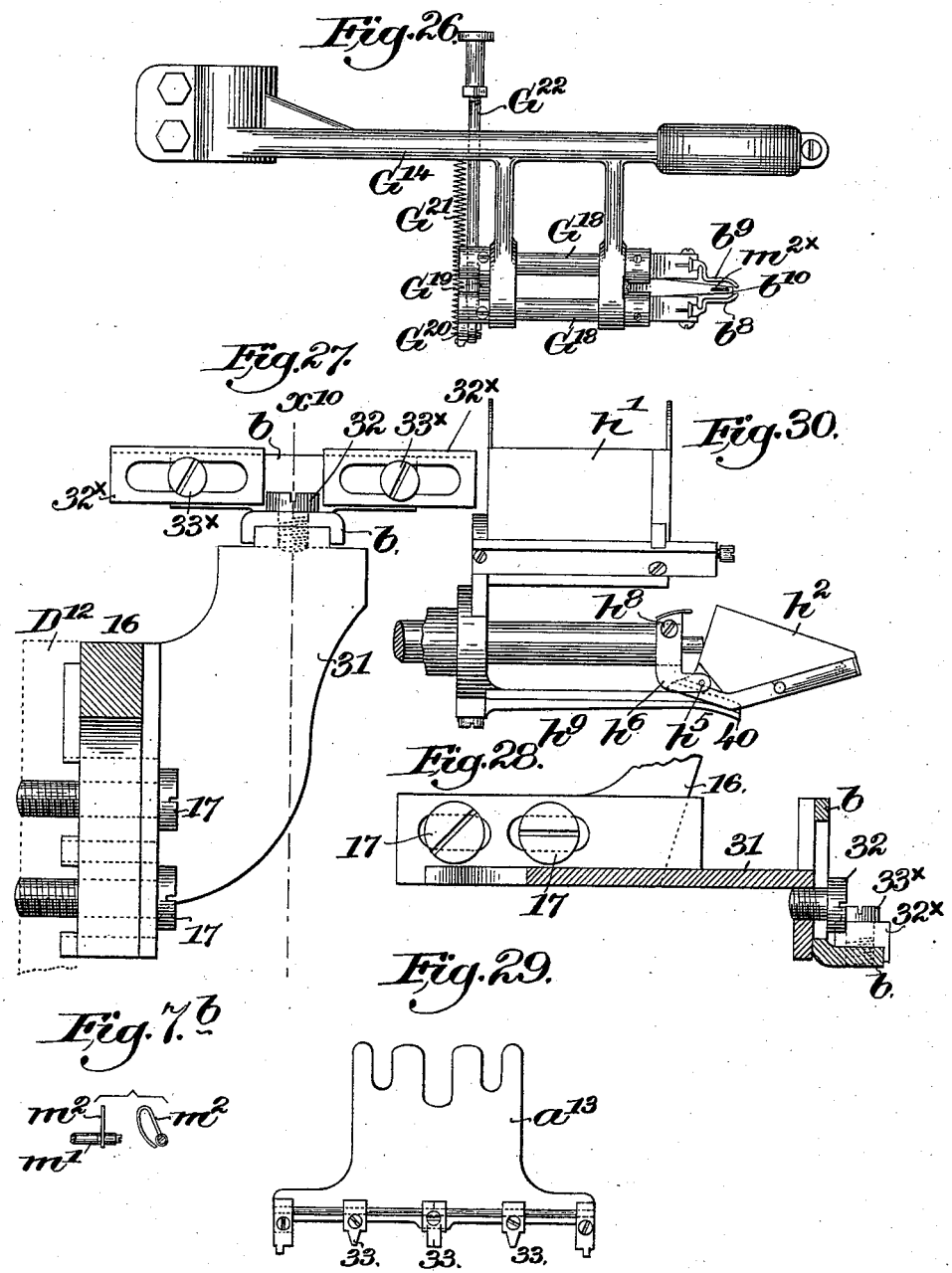

UNITED STATES PATENT OFFICE.

HENRY H. CUMMINGS, OF MALDEN, ASSIGNOR TO J. C. BROWN AND B. F. BROWN, OF BOSTON, MASSACHUSETTS.

BAG-FILLING MACHINE.

SPECIFICATION forming part of Letters Patent No. 539,171, dated May 14, 1895.

Application filed June 20, 1891. Serial No. 396,926. (No model.)

*To all whom it may concern:*

Be it known that I, HENRY H. CUMMINGS, of Malden, county of Middlesex, State of Massachusetts, have invented an Improvement in Bag-Filling Machines, of which the following description, in connection with the accompanying drawings, is a specification, like letters and numerals on the drawings representing like parts.
This invention, relating to machines for filling bags, has for its object the production of a reliable and simple machine, more especially adapted for seed and other small or fine material which is to be put into paper bags.
In accordance with my invention, a pile of bags to be filled is placed in a suitable guide-box where they are held between a follower and suitable yielding catches, the guide-box preferably having a reciprocating motion imparted to it to aid in detaching the endmost bag to be filled. The seed or other material to be put into the bags will be discharged in measured quantities into a funnel having a rising and falling movement, the funnel being supplied with material from a measuring device which has reciprocating with it a suitable hopper to insure the filling of the measuring device when the latter is moved from the hopper into the funnel and made to discharge or empty itself therein.

Preparatory to supplying the bag with material from the hopper the bag has to be opened, and to do this unerringly I have provided a yielding or flexible bag-opener which enters between the lip of the bag and the shorter ply thereof; and to insure the greater efficiency of connection of the bag-opener, I prefer to employ a stationary lip-holder, against which the leading end of the bag-opener strikes on its way into the bag, the said lip-opener engaging the inner side of the lip of the bag to be entered. At the same time that the lip-opener enters the bag, bag-spreaders also get into the bag and are moved laterally away from each other within the bag toward its side edges, the said spreaders stretching the bag open and holding it accurately in position while the seed or other material is deposited therein.
I have provided the machine with a stop-motion device, which will be described, it having for its function to prevent the discharge of seed from the hopper into the funnel when, for any reason, the bag-opener or spreaders do not correctly enter a bag.

Before the bag is entered by the bag-opener it is acted upon by a pasting device which, in this instance of my invention, applies paste to the bag in spots.

After opening the pasted bag and filling the same, the bag is grasped by or between the jaws or arms of a bag-carrier and is brought down into position opposite a folding-plate or bed, preferably of india rubber, and immediately thereafter a clamping device acts upon the bag to clamp it against the folding-bed so that the carrier, in its further movements, may open and retire from the bag. The bag, held in position upon the folding-bed by the clamping device which acts in a yielding manner, is next acted upon by a folding-blade which impinges upon the bag near the point where the paste or glue, preferably applied hot, is put upon the bag, and thereafter a lip-turning device, acting against the rear side of the lip of the bag, is caused to travel down along over the surface of the said folding-plate and lay the lip of the bag over upon the acting edge of the folding-blade, preparatory to setting the lip firmly in place and closing the bag. The lip of the bag having been closed, the clamping device and the folding-blade retire, letting the bag drop, and as the latter descends its lower end is automatically thrown aside out of the path of movement of the bag-carrier, which at that time is rising, to again take the filled bag and bring it down into position.

The particular features in which my invention consists will be hereinafter more fully pointed out in the specification and made the subject of claims at the end thereof.

Figure 2:
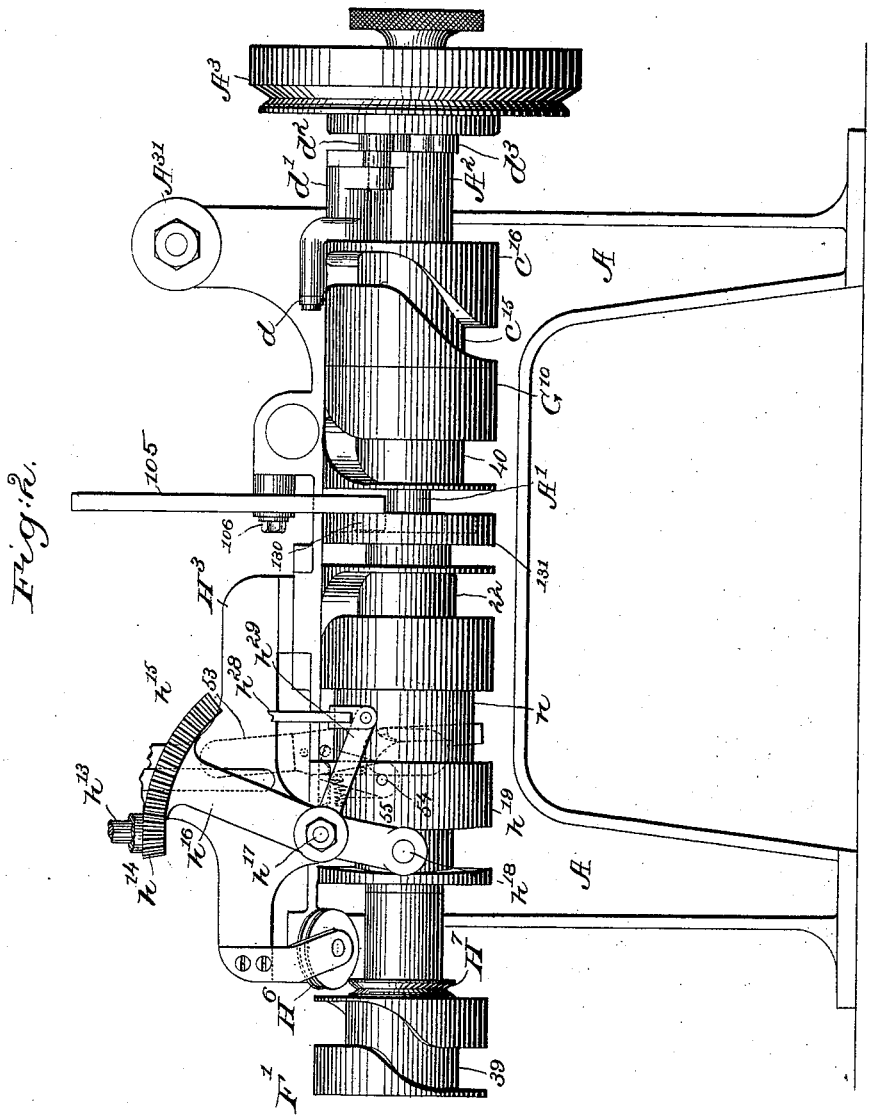

Figure 1 is a front elevation of a bag-filling machine embodying my invention, a filled and pasted bag lying on the folding-bed; Fig. 1ª, a section in line *x*. Fig. 1ᵇ shows a pasted bag; Fig. 1ᶜ, a detail to be described. Fig. 2 is a partial rear side elevation of the machine chiefly to show the cam-shaft, its cams, and some of the main parts actuated thereby. Fig. 3 is a partial side elevation of the hopper and some of its co-operating devices on a larger scale; Fig. 3ª, a partial vertical section of the parts shown in Fig. 3. Fig. 4 is a detail of one of the scoops, such as employed at the inner side of the hopper. Fig. 5 is a partial plan view of the machine shown in Fig. 1, the bag-presenting mechanism, holding mechanism, paster, and funnel being omitted. Fig. 6 is a detail relating to the folding mechanism for the lip of the bag. Fig. 7 is a detail of the gumming mechanism; Fig. 7ª, a detail chiefly to show the risers and lip-turning devices. Fig. 7ᵇ is a detail showing the feeler $m^2$. Fig. 8 shows in elevation the funnel, the bag opening and spreading mechanism moved in unison therewith, and part of the means employed to prevent the discharge of seed in case the bag is not present when the funnel descends; Fig. 8ª, a detail to be referred to. Fig. 9 is a detail of the mechanism forming part of the spreading mechanism. Fig. 10 is a section through the hopper in the direction of the main shaft of the machine. Fig. 11 is a detail of the gummer employed in the gumming mechanism. Figs. 12 and 13 are details of the bag-folding mechanism. Fig. 14 is a detail of the folding-blade. Fig. 15 is a section in the line $x^2$, Fig. 11, looking to the right. Fig. 16 is a vertical cross-sectional detail, omitting the hopper, the funnel, and the paste or gum box, the figure showing the folding-blade, the carrier, and the end of the guide-box or presenting mechanism for the series of bags. Fig. 16ª shows the lever $d^4$. Fig. 17 is a detail of the clutch mechanism. Figs. 18 and 19 are respectively views of the clutch-block and the clutch-cam. Fig. 20 is a detail of the clamping mechanism; Fig. 21, a detail of the cam-finger 105, forming part of the spreader-operating mechanism. Fig. 22 shows part of the follower and its supporting parts somewhat enlarged. Fig. 23 shows the lower end of one of the side plates C. Fig. 24 shows a detail of the bracket $D^2$ to support the gum-box; and Fig. 25 is a sectional detail of the fulcrum of the lever $c^8$, to be referred to. Fig. 26 is a top or plan view of the arm $G^{14}$, together with the bag opener and spreaders and shafts carrying the spreaders. Fig. 27 is an enlarged detail of the plate 31 and its attached finger; Fig. 28, a section in the line $x^{10}$, Fig. 27; Fig. 29, an enlarged plan view of the folding-blade; Fig. 30, a detail in side view of the receptacle $h'$ and measuring device.

The frame-work A of the machine is and may be of suitable shape to sustain the working parts. This frame-work has a main shaft $A'$ sustained in suitable bearings $A^2$, $A^2$. This shaft at one end has a suitable pulley, as $A^3$, to which is applied the power employed to drive the machine. This pulley may be of any usual or well-known construction. The frame-work has a rigid stud $A^4$, see Figs. 1 and 16, which receives a rocking sleeve $A^5$, see Figs. 6, 12, and 13, having at its opposite ends arms $A^6$, and near the middle of its length two ears $A^7$, through which is extended a bolt $A^8$ on which is mounted loosely a block $A^9$, see Fig. 13, the said block receiving as represented, in pits formed therein the inner ends of two screws $A^{10}$, $A^{12}$ screwed through suitable lugs attached to or forming part of the under side of the carriage $A^{13}$, forming part of the bag-presenting mechanism or guide-box. In practice this carriage has attached to it in suitable manner a track $A^{14}$ on which slides the stand $A^{15}$, to which is pivotally connected, as will be described, the follower $A^{16}$ which is constantly borne against the rearmost bag of the series or pile of bags to be filled, the lower ends of the said bags resting upon the bottom plate $A^{17}$ of the bag presenting mechanism, the said bottom plate having reected along each side of it suitable side plates $A^{18}$, the bottom plate and side plate forming a sort of open-topped guide-box and being made adjustable vertically with relation to the upper guide-bars $A^{19}$ by means of suitable set-screws $A^{20}$, the guide-box being adjusted vertically according to the length of the bag to be filled.

The follower plate $A^{16}$ has at its back a suitable block or lug $A^{21}$, through which is extended a bolt or stud 2, see Fig. 1, the said bolt pivoting the follower upon a link 3 in turn attached by a vertical pivot 4 to a shoe 5 applied upon the upper end of the stand $A^{15}$ and made adjustable thereon by means of a set-screw $A^{23}$. See Fig. 22. The block $A^{21}$ has attached to it a rearwardly extended arm $A^{24}$, which is normally acted upon by a spring 7, shown as interposed between the said arm and the shoe 5, so that normally the said spring acts to keep the upper end of the follower pressed a little the harder against the upper ends of the bags or the lip portions of the bags before they are entered by the bag-opener to be described, and before the said lips are pasted. The upper end of the follower, as best shown in Figs. 1 and 16, has a lip 8 which is extended up substantially as high as the lips of the bags, shown by dotted lines B $g$.

The arm $A^{24}$ has an adjustable extension $A^{25}$, which, when the series of bags in front of the follower have been taken off, will contact with the cross-bar $A^{26}$ and stop the further feeding movement of the follower under the action of a suitable weight, not shown, attached to a cord $A^{27}$ led over suitable pulleys and through the lower part of the machine, where the weight, or it may be a suitable spring, is located.

The carriage $A^{13}$ referred to has at its inner end a folding-bed B, see Figs. 6, 12, and 13, composed preferably of a piece of india rubber, the rubber being held to the bed, as herein represented, by means of set-screws $B^\times$, the carriage near the said bed having at each end a front stop $B'$, held in place by a suitable screw $B^2$. The said carriage also has back stops $B^3$, shown in Fig. 7ª, and has pivoted upon it between the front and back stops, risers $B^4$, shown as levers having their upper ends concaved and as pivoted at $B^5$.

The upper ends of the arms $A^6$ are slotted to receive a cross-bar $B^6$ having notched ends, as best represented in Fig. 6, which are engaged by hooks $B^7$ acted upon by springs $B^8$, the lower ends of the said springs being attached by screws $B^9$ to the said arms $A^6$. The cross-bar $B^6$ serves as a support for the lip-closing device $B^{10}$, shown as a roll which, at the proper time, as will be described, through the action of the arms $A^6$ will be made to roll down over the folding-bed B.

When the lip-closing device $B^{10}$ is back in its normal position its outer ends rest upon the risers $B^4$, and the periphery of the lip-closer is raised a little above the folding-bed, see Fig. $7^a$, but as the arms $A^6$ are moved to carry the lip-closing device $B^{10}$ down on or over the folding-bed, the risers, moving in unison with the arms and supporting the lip-closing device, enable the latter, it acting against the rear side of the lip of the bag, to come above the edge of the folding-blade and get well upon the upper cross folded end of the bag, and thereafter, in the further movement of the arms $A^6$, the risers strike the front stops $B'$ referred to and the arms $A^6$ carry the lip-closing device off from the risers, leaving the springs $B^8$ to act with their full force upon the lip-closing roll $B^{10}$ and hold it down upon the closed upper end of the bag.

The carriage $A^{13}$ just back of the folding-bed is grooved transversely at 100 to receive the rounded threaded feet of the stands or side plates C, having slots through which are extended one of the sets of screws $A^{20}$ for supporting in adjusted position the bag-containing box of the presenting device. The feet of the stands referred to are threaded to receive a right-and-left threaded screw $C'$, rotation of which in one or the other direction enables the side plates to be adjusted toward or from each other, according to the width of the bag. The rear ends of the side plates $A^{18}$ are supported in like manner by the feet $A^{9x}$, in turn provided with right-and-left threads to receive right-and-left threads on an adjusting screw $A^{30}$, so that the rear end of the box or guide $A^{18}$ may be adjusted in width for the width of the bag.

It will be noticed that for each width of bag a different bottom plate $A^{17}$ will be employed, the said bottom plate being easily inserted into or withdrawn from between the inner side plates $A^{18}$, and being supported by suitable shoulders 101 projecting inwardly therefrom, the bottom plate being slotted for the passage up through it of the stands $A^{15}$ referred to, Fig. $1^a$ showing a partial right section of the said box $A^{18}$ and its bottom plate on a smaller scale. Each side plate has adjustably attached to its upper end by a screw $8^x$ the feet 9 of a down-hold 10 which is extended forward, as represented in Fig. 1, to contact with the upper ends of the lips of the series of bags to keep them down upon the bottom plate, there being two such down-holds, one near each side of the series of bags, said down-holds being extended over the upper edges of a series of bags in the bag-presenting box.

The frame-work has attached to it by a suitable set-screw, as 12, shown by dotted lines in Fig. 1, an arm $C^{14}$ which is extended toward the front of the machine above the cross-bar $A^{26}$ and has adjustably attached to it by screws $C^5$ the lip-holding device $C^6$, the latter having a down-turned end 13 and preferably an upwardly extended saddle 15, the down-turned portion 13 at the forward motion of the carriage $A^{13}$ and its attached bag-presenting mechanism, acting as a front stop for the lip of the endmost bag of the series of bags B $g$, represented by dotted lines as in front of the follower in Fig. 1, it being necessary that the lip of the endmost bag be always in exactly the same position prior to its being opened and filled, whatever may be the number of bags in the series.

The side plates C, represented in Figs. 1 and 16, are provided with a series of holding pins or points $C^7$ which are fitted loosely in suitable holes near the front edges of the said plates, the inner ends of the said pins being of such shape as to slightly project inwardly beyond the inner faces of the side plates and rest in front of the endmost bag of the series of bags from near its lip to near its lower end, the said holding points or projections being normally acted upon by springs $C^8$, herein shown as pieces of spring wire, connected at their inner ends with the side plates and pressing with their outer ends against the outer headed ends of the holders, the said springs being sufficiently elastic to let the holding points move outwardly slightly to release the endmost bag after the same has been entered by the bag-opener to be described.

The lip $a$ of each bag B $g$, one of the said bags being shown separately in Fig. $1^b$, is extended for a short distance above the opposite ply of the bag, the said lip, when folded over as described, being made to adhere to the shorter ply of the bag by means of paste or gum, applied to the said shorter ply in the manner to be described.

In front of the bag-presenting mechanism or guide-box is a pasting mechanism, including as its chief parts a gum box D, see Figs. 1 and 7, attached by a screw $D'$ see Fig. 24, in an adjustable manner to a bracket $D^2$ secured to the frame-work, the loosening of the screw permitting the box to be drawn off from the bracket from the front of the machine.

The gum box D has suitable depending ears $D^3$, best shown in Fig. 1, which are slotted at their sides to receive suitable pins of a water-containing jacket $D^4$, the bottom of the said jacket being adapted to be acted upon by the heat of a suitable lamp or gas-burner, not shown, by which the water in the said jacket is kept hot to heat the glue or paste employed, I having found that hot glue applied to a bag will set instantly so that the bag, after its lip has been folded over, does not need to be kept under pressure for any considerable period in order to insure the retention of the lip, as is the practice in all other bag-pasting machines known to me. Inside of the box D is a suitable roll $D^5$ which is partially submerged in the glue or paste contained in the box, the greater part of the glue or paste standing in a leg $D^6$ of the box which extends down into the water jacket. The gum roll $D^5$ has a ratchet wheel $D^7$, which is acted upon by a suitable pawl $D^8$, herein represented as pivoted at $D^9$ on a folding-blade slide $D^{10}$ adapted to be reciprocated in guide-ways $D^{12\times}$ fast on the frame-work, the said pawl having its upper end normally in contact with the said ratchet wheel by means of a spring $16^\times$, shown in Fig. 1, so that at each time that the slide $D^{10}$ is moved to the right, the pawl will rotate the roll slightly so as to present a freshly glued or pasted surface to be acted upon by the pasting device.

The pasting device preferred by me is shown in Figs. 1, 11, and 15. This pasting device consists, as represented, of a bar E having pockets for a series of springs, as E', see Fig. 11, the springs acting upon a series of spotters $E^2$, represented as having heads at their inner ends, and as extended through a plate $E^3$ attached to the bar E by a suitable screw or screws $E^4$. The bar E has suitable ears $E^5$, see Figs. 11 and 16, provided with suitable holes to receive pins or journals $E^6$ $E^{6\times}$ by which to pivotally mount the said pasting device in ears 166 of an upwardly extended pasting arm 16, attached by suitable screws 17 in an adjustable manner to an upwardly extended arm $D^{12}$ of the slide $D^{10}$, the said arm being moved backward and forward in unison with the said slide.

The paster at times has to be moved in such manner as to place the spotters against the surface of the roll in the gum-box, and then has to be revolved for one hundred and eighty degrees so as to enable the spotters, provided with glue, to transfer the glue upon the shorter ply of the bag, in spots, as shown best in Fig. $1^b$. To insure this partial oscillation of the pasting device automatically, I have provided the said device, see Fig. 15, with toes 18, and have rounded the under side of one of the ears or lugs $E^5$, and have extended forwardly from the paste-box a notched finger $D^{13}$, so shaped as to present, as herein represented, plane surfaces at each side of the notch, and as the pasting device is moved horizontally backward and forward, as soon as the rounded edge of the pasting device approaches the notch in the finger one of the toes referred to strikes a projection 19 at the rear side of the finger and causes the rounded end of the lug to tip down into the notch, thus turning the paster over for about one hundred and eighty degrees. The arm and notch are shown separately in Fig. 15.

The notched finger and the toes constitute the tipping device for the pasting device; but instead of the particular tipping device shown, I may employ any other suitable or equivalent device.

The slide $D^{10}$ referred to has a stud 20 adjustably secured thereto by a nut 21, the stud being held in a slot of the carriage. The stud 20 is extended through an opening or slot in the frame-work, and enters the cam groove 22 in a cam $D^4$ fast on the main shaft A', said cam reciprocating the said slide. The arm $D^{12}$ of the slide $D^{10}$ supports a stud $a^3$, to which is rigidly clamped in suitable manner the depending arm $a^4$ forming part of the bag-clamping device, the other essential part of the said clamping device being a spring-held or supported bar $a^5$, the said bar in practice having extended backwardly from it rods $a^6$ which are surrounded between the arm and bar with suitable springs 23 which normally act to keep the bar pressed forward toward the bag to be clamped, the rods having extended through them, in the present instance, a suitable pin 24 to act as a stop by contact with the rear side of a part of the arm $a^4$, to thus limit the movement of the bar $a^5$ to the right, viewing Fig. 1. There is one such rod near each end of the bar $a^5$. The stud $a^3$ also has mounted upon it loosely the arm $a^7$ having a T-shaped lower end $a^8$. See Fig. 14. The end $a^8$ receives loosely through it two headed sliding pins $a^9$, represented as enlarged to receive the ends of a suitable spring $a^{10}$, the strength of which is regulated by a thumb-screw $a^{12}$ having a suitable annular groove to receive and engage the said spring. These headed sliding pins $a^9$ form yielding connecting devices which confine the folding blade $a^{13}$, see Fig. 16, in a yielding manner upon the upper rounded side of the part $a^8$ referred to, so that the said blade, after its forward edge strikes against the bag just at or below the upper edge of the shorter ply thereof, the bag then resting on the folding bed so that the said blade, as the lip-turner acts on the back of the lip of the bag and is rolled forward and down to turn the said lip over the edge of the folding blade may yield, the roll in its descent, after it folds the lip over and while it is traveling down over the folding bed, acting to depress the front edge of the folding blade in advance of it, forcing the said folding blade out from under the lip, the lip-closing device rolling the lip down snugly upon the pasted shorter ply of the bag. During this operation of folding over the lip of the bag upon the pasted ply thereof to close the bag, the clamp $a^5$ referred to impinges the bag a short distance below its upper end against the folding plate, the clamp holding the bag until the turning over of the lip is completed.

I have found in practice that the shorter ply of the bag does not need to be provided with glue or paste entirely across from one to the other side of the bag, and this is of material advantage, because I am enabled to put the folding blade into contact with the shorter ply of the bag close to its upper end where it is pasted without having the blade injuriously covered with glue or paste.

In practice I prefer to and do apply to the edge of the folding blade three like dogs 33, see Figs. 14 and 29, the outermost dog contacting with the bag near its side edges, and the central dog substantially in the center line of the bag, and vertically in line with these dogs I omit from the pasting device the spotters, the latter applying paste to the bag in spots indicated by the round dots in Fig. $1^b$, leaving clear spaces on the bag opposite the dogs 33 for the action of the dogs during the folding operation, and so that the dogs will not contact with the spots of the paste already applied upon the bag and to enable the same folding blade to co-operate properly with bags of different widths, I prefer to and have made the said dogs adjustable horizontally upon the front edge of the folding blade by suitable screws; but I desire to have it understood that my invention would not be departed from if the dogs were omitted and the front edge of the folding blade came directly against the ply of the bag.

The arm $a^7$ carrying the folding blade has its hub loosely mounted, as stated, upon the stud $a^3$. This stud has clamped upon its outer end a hub 35 provided with an ear 36, to which is attached at one end a spring 37, the said spring being bent around the hub of the arm $a^7$, the outer or front end of the spring acting upon a portion of the said arm and normally keeping a projection 38 of the said arm $a^7$ against the lug 36 referred to.

The folding blade and clamping device derive their movement from the slide $D^{10}$, and when the said slide is moved to the right in Fig. 1 the clamping device first comes in contact with the bag, impinges it upon the folding bed, and in the further movement of the slide to the right the bar stands still while the arms $a^4$ and $a^7$ continue to travel to the right, and the acting edge of the folding blade or its fingers then impinge against the bag as stated, preparatory to the downward movement of the lip-closing roll, which latter movement is effected by the cam F attached to the cam-shaft A′, it having a suitable groove 39 which receives a roller or other stud of an arm F′ pivoted upon a stud 40, the said arm being jointed to the carriage $A^{13}$ by a long stud 104 so that the said carriage, as it is moved forward, causes the screw $A^{10}$, see Fig. 13, acting on the block $A^9$, to rock the sleeve $A^5$ and the arms $A^6$, the return movement of the carriage $A^{13}$ causing the screw $A^{12}$ acting on the said block to rock or turn the arm $A^6$ in the opposite direction to place the lip-turning roll in its normal position.

As the carriage $A^{13}$ is reciprocated as described, it carries the bag-presenting mechanism with it, this being desirable, as it facilitates the detaching of the endmost bag from the series of bags.

The screws 17 used to connect the arm 16 with the arm $D^{12}$, see Fig. 16, of the carriage $D^{10}$, also serve to hold an arm 31, see Figs. $1^c$, 16, 17 and 28, to which is adjustably attached the bottom - regulating finger $b$, it being adapted to act on the lower end of the endmost bag of the series of bags and push it back so that the upper end of the bag shall have a better chance to be held forward against the lip-holder $C^6$ while the bag is to be pasted. This bottom-regulating finger is made adjustable vertically by a screw 32, so that the finger may be adjusted to bags of different lengths, or may be made to follow the bottom plate $A^{17}$ and as shown in the drawings, said finger has adjustable extensions $32^x$ held by screws $33^x$, said extensions providing for bags of different widths.

An ear $A^{31}$ of the frame-work receives in it a stud G having a head, and upon this stud between its head and the said ear $A^{31}$, is mounted a sleeve G′ having an attached arm $G^2$ grooved or cut away at $G^3$, see Fig. 1, to receive a loose block $G^4$, shown by dotted lines, upon a stud-bolt $G^5$, fast by a nut $G^6$ to an elbow lever $G^7$ having its bearing upon a stud $G^8$ fast in the frame-work, the lower end of the said lever $G^7$ having a roller or other stud $G^9$, which enters a cam groove 40 in a cam $G^{10}$ secured to the main-shaft A′, the said cam vibrating the said lever $G^7$ so that the loose block on the stud $G^5$ vibrates the arm $G^2$ and sleeve G′, and to this sleeve is clamped, as herein represented, by suitable bolts $G^{12}$ the split head $G^{13}$ of an arm $G^{14}$, provided at its front end with the funnel $G^{15}$, the snout 41 of which depends and is adapted to enter the open mouth of the bag. The arm $G^{14}$ has two like projections $G^{17}$ which support two like rock-shafts $G^{18}$, each provided near its upper end with an attached gear $G^{19}$ the teeth of which mesh together, one of the said gears having an arm $G^{20}$ to which is connected a spring $G^{21}$, the other end of the spring being fast to the arm $G^{14}$. The arm $G^{20}$ has also pivoted upon it a rod $G^{22}$ having an adjustable striker $G^{23}$, shown as a thumb nut, screw-threaded and adapted to be adjusted on the screw-threaded end of the rod. The inner ends of the rock-shafts referred to have like arms $b^6$, see Fig. 1 and dotted lines Figs. 8 and $8^a$, provided with spreaders $b^8$, $b^9$ adjusted in front of the bag-opener $b^{10}$, the spring $G^{21}$ referred to normally keeping the spreaders substantially closed together.

The bag-opener $b^{10}$, as herein represented, has a yielding spring-finger, suitably attached at one end to a part of the moving arm $G^{14}$, the acting end of the bag-opener being preferably turned outwardly and being adapted, as the arm is thrown down toward the bag, to strike just above the lip-holder so that the said bag-opener will slide down in contact with the said lip-holder and get behind the shorter ply of the upper end of the bag, the bag-presenting mechanism at such time being held forward to the left, the pasting device being retracted, it having previously operated to paste the bag. As the bag-opener enters the bag the spreaders follow it, and in their descent into the bag the spreaders are separated toward the edges of the bag by means of a cam finger 105 against which the end of the rod $G^{22}$ strikes during the descent of the arm $G^{14}$, the said finger preferably having a slow vibration imparted to it by means of a cam on the main shaft, the finger being pivoted at 106. As the spreaders are separated, they, acting with the bag-opener, detach the endmost bag from the series of bags, this being facilitated by the circular movement of the bag-opener while the bags stand in substantially vertical position, but this detaching of the bag may be facilitated somewhat by at that time moving the bag-presenting mechanism slightly backward. Just as the bag is fully opened by the combined action of the spreaders and the bag-opener, and when the spreaders have a sufficient hold upon the inner side of the bag to support or sustain it, the seeds are delivered into the bag from the snout of the funnel, which snout then stands in the mouth of the bag. The seeds having entered the bag, the latter must be taken off from the funnel and the bag-opener and the spreaders, and to do this I have provided the machine with a bag-carrier, herein represented as a pair of jaws $c$, $c'$ of suitable shape to grasp between them the lower end of the bag, the jaw $c$ having a support $c^2$ to receive against it the bottom of the bag. The jaw $c$ is secured to a rod $c^3$ supported in ears of a bar $c^4$ having a shank $c^5$, which is adjustably attached by screws $c^7$ to an arm $c^8$ having a split hub $c^6$, clamped by a bolt $c^9$ upon a sleeve $c^{10}$ mounted upon a stud $c^{12}$, the said sleeve having an arm $c^{13}$ provided with a roller or other stud $c^{14}$ which enters a cam groove $c^{15}$ in a cam $c^{16}$ fast upon the main shaft. The bar $c^4$ which receives the rod $c^3$ serves as a support for the jaw $c'$ of the bag-carrier, the said jaw being rigid. The clamp having been raised to grasp the lower end of the filled bag, the arm $G^{14}$ is immediately elevated to elevate the funnel and withdraw the bag-opener and spreaders from the bag, the spreaders in their upward movement being brought together by the spring referred to. The bag-carrier continues to descend until it places the top of the bag exactly in folding position to be acted upon by the clamp, and by the folding blade, and by the lip-turning device, as previously stated. While the lip-turning device is rolling down and acting against the rear side of the lip to turn it over the folding blade, and while the bag is clamped as stated, the bag-holding devices in their further downward movement are opened to release the bag. This is done by means of a slide-rod $d$, see Fig. 25, extended through the stud $c^{12}$ and jointed to one arm of a crank $d'$, see Fig. 2, the other arm of the crank having a roller or other stud $d^2$, which is acted upon by a cam $d^3$ set in motion by the main shaft. This rod $d$ referred to, when pushed in, acts upon an arm $d^4$ of a bell crank lever mounted upon a stud $d^5$ erected in an ear $d^6$ of the hub of the arm $c^8$, another arm $d^7$ of the said bell crank lever, see Fig. 16$^a$, receiving through it a rod $d^8$, see Fig. 1, which is connected at its opposite end to an arm $d^9$ of the shaft $c^3$ referred to, to which is connected the movable jaw $c$ of the bag-carrier, the movement of the lever $d^4$ by the said slide-rod $d$ effecting the opening of the bag-carrier, the spring 107 connected to a collar on the rod $d^8$ and to the arm $c^8$, normally acting to keep the bag-carrier jaws closed upon the bag. The bag-carrier draws the lower end of the bag down into a bag-remover consisting essentially of like side plates $e$, $e$, preferably made adjustable laterally upon a rod $e'$ mounted in a lever $e^2$ attached to a rock-shaft $e^3$ having its bearing in a stand $e^4$ secured to the frame-work. The lever $e^2$ of the rock-shaft $e^3$ is slotted at $e^6$ to receive a stud $e^7$, to which is connected the inner end of a rod $e^8$, adjustably connected by a screw $e^9$ to a collar $e^{10}$ mounted on the stud 104 which connects the arm F' with the carriage $A^{13}$, so that as the carriage is moved backward and forward as described, the said side plates $e$ are moved backward and forward, but at a speed greater than that of the carriage. These side plates have spring fingers $f$ which, when the upper ends of the said plates are carried backwardly, which is done as the carriage $A^{13}$ is retracted and while the lip-closer $B^{10}$ rises and the bag-carrier comes up for a new bag, causes the lower end of the bag to be carried to one side, so that the bag-carrier cannot in its ascent strike the lower end of the bag which it previously brought down. The filled bag drops upon the inclined plate $f'$ as soon as the lip-closing device in its upward movement retires from the bag.

For a very short-lipped bag I prefer to provide the folding bed with a slight transverse rib 110, see Figs. 6 and 13, which will support the back of the bag just above the clamping device and between it and the upper edge of the shorter ply of the bag so that, when the clamping device impinges the bag against the folding-bed, the resistance of the rib 110 will cause the upper end of the bag to curl forward and keep the lip from being caught under the roll, thus allowing the roll to come well behind the lip and turn it over against the folding-blade which continues to advance after the bag has been clamped and co-operates in tucking the end of the bag back under the advancing roll.

The rib 110 may be a piece of rubber or metal cemented or secured to the folding-bed in any suitable manner.

The filled bag, dropped as described, may be taken away by any usual means.

I will now describe the hopper and the contrivances co-operating therewith to put the seed in measured quantities into the funnel.

The hopper H, shown in plan view Fig. 5, in elevation Fig. 1, and in enlarged detail Figs. 3 and 3ª, is in this instance made cylindrical, and has its hub H′, see Figs. 5 and 3ª, mounted loosely on a hollow sleeve H² forming part of a bracket H³ erected upon the frame-work. The hopper is suitably grooved externally, as at H⁴, to receive a driving belt H⁵ extended about the hopper and about an idle wheel H⁶, see Fig. 2, the belt being extended around a grooved pulley H⁷ fast on the shaft A′, the rotation of the shaft rotating the hopper. The hopper is provided at the inner side of its periphery, see Fig. 10, with a series of buckets $h$, see also Fig. 4, where a portion of the hopper is shown in section, together with one of its buckets. These buckets, in the rotation of the hopper carry up the seed or other material supplied to the hopper through, preferably an opening at one side of the hopper, see Fig. 3ª, at its center of rotation, and drops the seed into a box-like receptacle $h'$, shown in Figs. 3ª, 10 and 30, the bottom or lower end of said receptacle being open.

The measuring device, to be described, when directly under the receptacle receives from the latter the seed fed into it by the buckets, and the measuring device is moved at suitable intervals away from under the said receptacle to discharge its load of seed or other material into a funnel $G^{15}$ having a snout 41.

The measuring device $h^2$, shown, consists of a box shaped somewhat like a scoop and having, in this instance of my invention, an adjustable bottom $h^3$ pivoted, see Fig. 3ª, at $h^4$, said bottom being adapted to be raised and lowered to thereby determine the amount of seed to be taken by the measuring device. The device for adjusting the bottom $h^3$ is shown as a worm 112, see Fig. 3ª, which engages a series of worm teeth 113 fixed to the measuring device, rotation of said worm in one or the other direction raising or lowering the said bottom.

The measuring device herein shown is pivoted at $h^5$, see Figs. 3ª and 30, upon a collar or head $h^6$ clamped by screw $h^8$ to the slide-rod $h^7$, and it is represented as adapted to slide on a track $h^9$ having a downturned end 40.

When the measuring device is moved from the position shown in Fig. 3ª under the receptacle, out in the direction shown in Fig. 30, the measuring device may tip as it comes onto the end of the track or over the funnel, and empty its load of seed. The tipping over of the measuring device may also be aided by the spring-pressed pin $h^{10}$ in the slide-rod $h^7$. The slide-rod $h^7$ at one side of its outer end, see Fig. 5, is provided with a series of teeth 410, which are engaged by a pinion $h^{12}$ on a short vertical shaft $h^{13}$, which is moved when the measuring device is to be actuated to supply a measured quantity of seed to the funnel 41, the lower end of the said shaft, see Fig. 3ª, being provided with a beveled gear $h^{14}$ which is engaged by a beveled toothed segment $h^{15}$, see Fig. 3, at the upper end of a lever $h^{16}$ pivoted at $h^{17}$, the lower end of said lever having a suitable roller or other stud $h^{18}$ which enters a cam groove in a cam $h^{19}$ loose on the shaft A′, the said cam having combined with it a clutch device to be described, so that the cam will be rotated in unison with the shaft so long as a bag is properly present upon the opening device, but should, for any reason, a bag fail to be taken by the opening device, then the clutch will be actuated to release the said cam and leave the measuring device at rest so that it will not be moved out from under the receptacle and have the seed therein wasted.

The arm $G^{14}$ at its under side, see Fig. 8, has a bearing $m$ which receives a feeler-carrier $m'$, shown as a bent arm, see Fig. 8, having at one end a feeler $m^2$ and at its other end a prong $m^3$, see also Fig. 7ᵇ, the said feeler normally standing, see Fig. 1, between the spreaders, the feeler being projected through a slot $m^{2\times}$ in the bag-opening device. A suitable spring, not shown, normally keeps the feeler pressed toward the bag-opener, but the pressure of the spring is so slight as to be readily overcome by the action against the feeler of the upper end of the shorter ply of a bag into which the bag-opening device is descending, such shorter ply acting to turn the feeler to the left viewing Fig. 1 and retract it from the said slot $m^{2'}$; but should, for any reason, the opening device fail to enter a bag, then the feeler will not be pushed back as described. Whenever a bag is present upon the bag-opener at the time that the seed ought to be delivered during the descent of the funnel, the said feeler, by the action against it of the shorter ply of the bag, is so turned as to place the prong $m^3$ of the arm $m'$ in such position that it will not strike the cam pin 52, see Figs. 1, 16 and 17, at the upper end of the lever 53 to be described, which lever is instrumental in moving the clutch before referred to, and said lever is not moved to disengage the clutch, but should a bag be absent at such time then the prong of the said arm will strike the pin or projection 52 and will move the said clutch-operating lever 53, see Fig. 17, in the direction to free the cam $h^{19}$ instrumental in moving the measuring device so as to leave said cam loose on the shaft A′, so that the measuring device will not be thrust forward at that time.

The lever 53 referred to, pivoted at 52ˣ, see Fig. 17, and acted upon by a spring 53ˣ, has its lower end curled inwardly below the block $n$ fast on the shaft A′, the said block having a notch $n'$, see Fig. 18, into which normally enters the dog $n^2$, see Figs. 17 and 19, pivoted at 54 on one side of the cam $h^{19}$, the said dog being acted upon by a suitable spring 55, which normally keeps the free end of the dog pressed toward the block $n$ and into its notch $n'$. The diameter of the block $n$ is less than the diameter of the cam $h^{19}$, and the end of the dog $n^2$ projects somewhat beyond the periphery of the block, see Fig. 17, so that when the lever 53 referred to is turned, as stated, as when a bag is absent, the lower end of the lever will be put in position to be struck by the dog in the rotation of the shaft A', and a dog will be pushed out of engagement with the notch in the block $n$, thus leaving the cam $h^{19}$ loose on the shaft, a suitable friction device $n^5$, see Fig. 19, acted upon by a screw $n^6$, acting to prevent all motion of the said cam $h^{19}$ as soon as the dog is released, as stated.

The flexible bag-opening device, the point of which, as herein shown, is adapted to be put into position with relation to the open end of the bag by means of a lip-holder or equivalent directing device located immediately above the mouth of the bag, is an important and essential element of this invention, and the same is of value even were the spreading devices entirely omitted; but the spreading devices are very essential, because by them the bag is spread open and is maintained in upright position without liability of becoming twisted about or detached from the snout 41 of the funnel during the filling operation.

This invention is not limited to the exact shape shown for the flexible bag-opening device.

Prior to my invention I am not aware that a bag-spreading device having a movement from the central part of the bag outward toward its side has ever been employed, so this invention is not to be limited to the particular shape of the bag-spreading mechanism, or to the actuating means therefor.

I prefer to mount the bag-opener and the bag-spreading devices in such relation to the funnel as to rise and fall in unison therewith.

The feeler referred to, having the arm $m^3$ and the lever 53 to control the clutch composed essentially of the dog $n^2$ and the collar $n$, constitute what I shall denominate stop-motion mechanism for the seed-measuring device.

Prior to my invention I am not aware that a bag-filling machine has ever been provided with a bag-carrier to grasp the filled bag, take it away from the filling devices, and put it into position with relation to the pasting and folding mechanism. Hence this invention is not to be limited to the particular construction shown for the bag-carrying device, or its actuating details.

In Fig. 3ª it will be noticed that the back of the hopper is bulged outwardly or dished, as at $h^{15}$, and that the central portion of the dished part is open, as at $h^{16}$. Outside this hopper is located a feed chute $h^{17}$, having a spout $h^{18}$ extended within the space $h^{16}$, so that seeds supplied the feed chute $h^{17}$ by hand, or otherwise, will be discharged into the hopper H. The feed chute $h^{17}$ referred to is fast upon the sleeve H². I have attached to the feed chute an auxiliary feed chute $h^{20}$, which may be supplied with seed from any elevated box or other holder for a large amount of seed or powder, or of whatever material it may be desired to put into the bag. Between the main and the auxiliary feed chute is a gate $h^{21}$ pivoted at $h^{22}$, and this gate may be opened more or less, as desired. Within the main feed chute and below the said gate is a dam, composed preferably of a bottom plate $h^{23}$ and flexible sides $h^{24}$. The rock-shaft $h^{26}$ to which this dam is positively connected has an arm $h^{27}$, see Fig. 5, provided with a stud 43 which enters a slot 44, see Fig. 3, in a link $h^{28}$ connected by some form of universal joint to an arm $h^{29}$ fast to the hub of the arm $h^{16}$ before referred to, so that as the said arm is moved the said link is raised and lowered, the bottom of the slot in the said link acting on the said pin to lift the dam during the upward movement of the link, unless the said dam is already lifted or held up by reason of the foot $h^{30}$, see Fig. 10, resting on seed contained in the backwardly bulged part $h^{15}$ of the hopper, said foot, when enough seed is in said hopper to well supply it, riding on the seed and through the rod $h^{31}$, carrying the foot and jointed to the rod $h^{32}$ on the rock-shaft $h^{26}$, thus turning the rock-shaft to lift the dam and prevent the further discharge of seed over it from the auxiliary feed chute. When there is insufficient seed in the hopper, the foot $h^{30}$ drops, turns the rock-shaft $h^{26}$, and places the pin 43 referred to in position to be struck by the bar $h^{28}$. The link or rod $h^{31}$ carrying the foot $h^{30}$ is suitably guided in its movements by means of a screw 45, see Fig. 10, passed through a slot in the said rod.

The under side of the measuring device is provided with a piece of felt or other soft, yielding substance 46 secured thereto in any suitable manner, the said felt, in its movements in the measuring device about its center, preventing the jamming of any seeds which may be lying in the funnel into which the said measuring device is projected to discharge its seeds.

The receptacle $h'$ has attached to it a front portion or plate $m^4$ by screws 47, see Fig. 1, said plate having an opening $m^5$ for the passage of the measuring device into the open inner end of the funnel 41, the said plate below the outer end of the track $h^9$ having a slot 48 partially surrounded by a flange 49, so that any seed thrown out by the measuring device and not properly entered within the funnel is directed back into the hopper. The receptacle $h'$ has also connected to it by suitable screws 50 a plate $m^6$, and by the same screws is clamped a flexible scraper 51, see Fig. 10, preferably a piece of india rubber, the lower end of which terminates just flush with the top of the measuring device, as represented in Fig. 3ª, so that when the said measuring device is moved forward or to the right viewing said figure to discharge its seeds into the funnel, the said scraper will remove all the seed flush with the top of the measuring device, the seed so removed dropping freely back into the hopper.

The finger 105 before referred to has a roller or other stud 130 which enters a cam groove at the side of a cam 132 on the shaft A', the said cam moving the said lever slightly to aid in correctly timing the movement of the spreaders.

The upper end of the lever 105 is shown as cam-shaped, as is preferred, but this invention is not to be limited to moving the said lever by a cam, as the said lever may be held rigidly and have its acting edge cam-shaped to be struck by the part $G^{23}$.

The follower plate $A^{16}$ is, it will be understood from the foregoing description, mounted on a sort of universal joint connection, so that the plate is free to adapt itself to any variation in thickness of the pile of bags in front of it and pressed toward the holding device $C^7$, and this variation in thickness may be at the sides or bottom, according to where the bag is lapped in its manufacture.

The down-holds by extending over the series of bags prevent the bags from being lifted either by the pressure of the gumming mechanism or by reason of the reciprocation of the guide-box containing the pile of bags.

The lip-holder maintains its position with relation to the bag-opener, or does not reciprocate with the guide-box and down-holds, thus avoiding any liability of pulling backwardly with the guide-box the lip of the bag then on the bag-opener. While I prefer to use this lip-holder because it is very certain in its operation, yet this invention is not to be limited in all cases to its employment; for the bag-opener, being flexible, might strike against the inner side of the lip of the bag, the point of the bag-opener in such case not rising above the said lip.

The plate $f'$, against the inner side of which the filled and sealed bag drops, will in practice be vibrated so as to discharge the bag into a suitable box, as 133; but as claim is not to be made for means for moving the plate $f'$, such means partially shown need not be described.

By adjusting the screws $A^{10}$, $A^{12}$, the lip-turner may be made to travel down over the folding bed for a greater or less distance according to the length of the lip of the bag.

The folding-blade, the roll, and the folding-bed constitute what I denominate the folding mechanism, but this invention is not limited to the precise folding mechanism shown, as instead I may use any equivalent mechanism.

This invention is not limited to the exact shape shown for the bag-opening device, nor to the exact shape of the hopper, or of the funnel.

The bag-opener in this my invention is a positive device and enters the bag between its two plies and acts very differently from a blast of air blown at the mouth of a bag.

Having described my invention, without, however, limiting the same in all particulars to the exact construction of mechanism shown, but including within my invention all well-known or suitable equivalents, what I claim, and desire to secure by Letters Patent, is—

1. In a bag-filling machine, means to present a bag to be filled, combined with a flexible or yielding bag-opener to enter the mouth of and open the bag to be filled, substantially as described.

2. A bag presenting mechanism, including a guide-box, and a lip-holder; combined with an elastic bag-opener, and means substantially as described to operate it to enter the endmost bag at the end of the bag-presenting mechanism, substantially as described.

3. In a bag-filling machine, an intermittingly moving pasting device, and a guide box for the reception of a series of bags having their seal flaps arranged uppermost and to receive paste from said pasting device, combined with a down-hold located at the end of said box and acting on the seal flap ends of the bags to prevent them from rising in said guide-box under the action of the pasting device, and means for giving the guide-box a combined lateral and vertical movement to bring the bags in contact with the pasting device, substantially as described.

4. A guide-box; means to reciprocate it; down-holds to act on the upper ends of the lips of the bags; and a stationary lip-holder, to operate substantially as described.

5. A guide-box for a series of bags, combined with a series of spring-pressed sliding pins at each side of the guide box to retain the endmost bag of a pile of bags until pulled out of the said guide-box, substantially as described.

6. A guide-box for a series of bags, and down-holds to act upon the upper ends of the lips of the bags and keep them down in the said guide-box, combined with a flexible bag-opener, and actuating means to cause said bag-opener to be thrust into the endmost bag, substantially as described.

7. The longitudinally reciprocating guide-box to contain a series of bags to be filled; combined with bag-opening devices to enter the endmost bag and hold it open to be filled while the said guide-box is being retracted, substantially as described.

8. A bag-filling machine containing the following instrumentalities, viz:—a hopper; a measuring device; bag-presenting mechanism; and a movable funnel; and flexible bag-opening device, the bag-opening device opening the bag in order that the snout of the funnel may enter the mouth of the bag; the measuring device discharging its measured quantity of seed into the funnel to fill the bag, substantially as described.

9. In a bag-filling machine, a movable arm having an attached funnel, and a flexible bag-opener extended beyond the snout of the funnel; a guide-box to contain a series of bags; and a lip-holder located in the path of movement of the bag-opener and immediately above the mouth of the bag, to deflect the flexible bag-opener into the mouth of the bag to open the same for the reception of the snout of the funnel, substantially as described.

10. Bag-presenting mechanism to automatically present and hold with its open end uppermost a bag to be filled, combined with an arm or carrier made movable in the direction of the length of the bag, and a bag-spreading device composed of arms adapted to enter the bag and spread the same open in the direction of its width and keep it open while the bag is being filled, substantially as described.

11. Bag-presenting mechanism to present a bag to be filled, combined with a bag-opener, and with independent bag spreading devices adapted to enter the mouth of and hold the bag open while being filled, to operate substantially as described.

12. Bag-presenting mechanism to present a bag to be filled, and a bag-opener, combined with bag-spreading devices which enter the open end of and keep the bag with its open end up and spread, and a movable funnel having a discharge opening to direct the material into the bag while being held by the spreading devices, substantially as described.

13. Mechanism to present a bag to be filled, combined with a movable funnel, and a flexible bag-opener, and with means to move the funnel to cause it to approach the bag and have its snout entered therein and retracted therefrom, substantially as described.

14. A hopper; a measuring device therein; and means to move the said measuring device, combined with a funnel having a snout and adapted to receive the contents of the measuring device; and a bag opener to enter and hold open the mouth of the bag to be filled, in order that the snout of said funnel may enter inside of and thus direct into the bag the seed discharged into the measuring device from the hopper, substantially as described.

15. In a bag-filling machine, a measuring device, its actuating devices; a funnel; a bag-opening device; means to present a bag to be entered by the bag-opening device and snout of the funnel, combined with a stop-motion device whereby, when the bag is absent, the measuring device will not be actuated to feed the funnel, substantially as described.

16. A bag-filling machine containing the following instrumentalities, viz:—a bag-opening device to enter the open end of and pick a bag off from a series of bags; an independent funnel having a snout to enter the mouth of a bag opened by the opening device; and a bag-carrier to engage the filled bag and take it from the bag-opening device and present it in position to be folded, substantially as described.

17. A bag-filling machine containing the following instrumentalities, viz:—a bag-opening device to enter the mouth of a bag; an independent spreading device to also enter the bag; a funnel to discharge seed into the mouth of the open bag while held open by the spreading device; a bag-carrier to engage the filled bag and take it from the bag-opening device and spreader; and a folding-bed and folding-blade between which the bag-carrier deposits the bag to be folded, substantially as described.

18. In a bag-filling machine, a guide-box to present a bag; a pasting device to paste the bag to be filled, combined with an elastic bag-opener, substantially as described.

19. A guide-box to present a bag to be filled; a pasting device to paste the bag; and a bag-opening device, to enter the open end of a bag in said guide-box combined with a folding-bed and folding-blade, and a bag-carrier to take a filled bag from the bag-opener and present it in position to be folded, substantially as described.

20. A guide box to present a series of bags, and a pasting device consisting of a bar having a series of yielding or spring-supported pins, combined with the paste-box, its paste roll, and means to actuate the paste roller and present paste to the said pins, substantially as described.

21. In a machine for filling bags, a hopper; a funnel; a measuring device co-operating with said hopper; and an elastic bag-opening device projecting beyond the delivery end of said funnel and adapted to enter a bag and open it for the entrance of the funnel; combined with bag-presenting mechanism including a movable guide-box to present the endmost bag of a series of bags in position to be entered by said opening device, substantially as described.

22. A guide-box to present a bag to be pasted; a paste-box, and pasting device having a series of spring-pressed pins and provided with toes, and a lug; combined with a support on which the said bar is laid, means to move the said bar, the said support being notched and provided with a projection to insure the overturning of the said bar during its reciprocations, substantially as described.

23. A guide-box to receive a series of bags; and a sliding foot therein, combined with an attached follower adapted to conform to variations in the thickness at the side edges of the series of bags and made vertically adjustable with relation to said foot to co-operate with bags of different length, substantially as described.

24. In a machine for filling bags, the following instrumentalities, viz;—a guide-box to receive a series of bags; a bed located below and at the end of said box; a folding-blade adapted to impinge a part of the bag against said bed; and a roll, and actuating devices to cause the roll to roll over the said bed and turn the open end of the bag over, substantially as described.

25. A guide-box to receive a pile of bags, and a foot sliding therein, combined with a vertically-adjustable block 5, a pivoted link 3, the follower pivoted on the said link, the arm $A^{24}$ extended backwardly from the follower, and the stop $A^{26}$, to operate substantially as described.

26. In a bag filling machine, bag opening and spreading devices to enter and hold open a single bag, a bag carrier composed of two arms, and a rest to support the bottom of the bag; combined with means to open and close the said carrier to enable it to grasp and take a bag from the devices holding it and to thereafter release the bag at the desired time, substantially as and for the purpose set forth.

27. The combination with a bag folding device, its co-operating bed, of a vibrating arm $c^8$; the bar $c^4$ having its shank connected thereto; the rod $c^3$, its attached arm $c$; and means for rocking said rod $c^3$ and the rigid arm $c'$, substantially as described.

28. The bag-carrier composed of arms, one of which is pivotally-mounted, the arm $c^8$ supporting the said bag-carrier; the rod $d^8$; and the elbow lever $d^4$, combined with a slide-rod $d$, and means to actuate it, substantially as described.

29. In a bag-filling machine, a guide-box to present a bag to be filled; an elastic bag opener; a pasting device to paste the bag; and a folding-bed and folding-blade, combined with a clamp to clamp the filled bag upon the folding-bed while the folding-blade acts against the bag, substantially as described.

30. In a bag-filling machine, a guide-box to present a bag to be filled; a bag-opener; a pasting device to paste the bag; and a folding-bed and folding-blade, combined with a clamp to clamp the filled bag upon the folding-bed, and a lip-turning roll co-operating with the said folding-blade, as and for the purposes set forth.

31. In a bag-filling machine, a guide-box to present a bag to be filled; an elastic bag opener to open the bag; and a folding-bed, combined with a clamping device consisting essentially of a bar having guide-rods, and a carrying-arm $a^4$, and springs 23 surrounding said rods, to operate substantially as described.

32. A guide-box to present a bag; a pasting device to paste the bag at intervals, combined with a folding-bed, and a folding-blade having dogs to contact with the pasted bag at points where the paste is omitted, substantially as described.

33. A guide-box to present a series of bags to be filled, combined with a series of yielding holders or catches to act against the outer edges of the endmost bag, and a bag-opener to enter the bag and aid in detaching the same from the said guide-box, the holders or catches at such times yielding, substantially as described.

34. A guide-box to present a pile of bags to be filled; a follower to keep the said bags pressed forward; and a bag-opener, combined with a pressing device to press upon the lower end of the endmost bag of the pile of bags to aid in putting the same into proper position with relation to the bag-opening device, substantially as described.

35. A guide-box to present a pile of bags to be filled; a follower to keep the said bags pressed forward; and a bag-opener, combined with a pressing device to press upon the lower end of the endmost bag of the pile of bags to aid in putting the same into proper position with relation to the bag-opening device, and with a pasting device to apply paste to the bag, substantially as described.

36. A bag-carrier to take a pasted bag and put it into position for folding; and means to actuate the bag-carrier, combined with a folding-bed, and a lip-turning device, and with catches for moving aside the lower end of the bag out of the way of the rising carrier, substantially as described.

37. In a bag-filling machine, a folding-bed having a transverse rib, combined with a folding-blade, and with a lip-turning roll co-operating therewith, substantially as described.

38. In a bag-filling machine, a folding-bed having a transverse rib, combined with a folding-blade, and with a lip-turning roll co-operating therewith, and with a clamp to clamp the bag upon the folding-bed, substantially as described.

39. In a bag-filling machine, a folding-bed, and a folding-blade, combined with a lip-turning roll, and with means to cause the said roll to travel downwardly over the said bed and lay the lip of the bag over the folding-blade, substantially as described.

40. The folding-bed, combined with the lip-turning device, arms to actuate it, and with risers to lift the said lip-turning device upon the upper folding end of the bag, substantially as described.

41. The folding-bed, the roll and the folding-blade, combined with the arm to carry the said blade, and with means, substantially as described, to connect the said blade in a yielding manner with the said arm so that the said blade may tip, under the action of said roll substantially as described.

42. The folding-bed, and the folding-blade having dogs near its end, and the carrying-arm upon which the said blade is mounted in a yielding manner, combined with a lip-turning device co-operating with the dogs of the said blade, whereby the lip-turning roll causes the acting end of the folding-blade to descend, substantially as described.

43. In a bag-filling machine, a guide-box to contain a pile of bags; a follower therein to act upon the rearmost bag of the pile of bags; and a carriage to sustain the said guide-box, combined with means to reciprocate the said carriage, substantially as described.

44. In a bag-filling machine, the carriage $A^{13}$ having the folding-bed; a lip-turning device; a folding-blade; and a rocker having arms to actuate the said lip-turning device, combined with means to reciprocate the said carriage, and with adjusting screws to control the throw of the lip-turner according to the length of the lip of the bag, substantially as described.

45. The carriage $A^{13}$ having an attached folding-bed; means to reciprocate the carriage; a rocker having arms to support a lip-turning device; a lip-turning device carried by the said arms; and risers, substantially as described, combined with front and back stops for the said risers, substantially as described.

46. The folding-bed; the rocker having arms, and a bar $B^6$, springs $B^8$ to press the said bar toward the said bed, combined with the roll $B^{10}$, and with a folding blade to operate substantially as described.

47. In a bag-filling machine, the vibrating arm $G^{14}$, its attached funnel, and bag-opener, combined with spreaders, the rock-shafts $G^{18}$, and with means to actuate the said rock-shafts, substantially as described.

48. The arm $G^{14}$; the rock-shafts $G^{18}$ thereon their attached spreaders, and the gears to connect the said rock-shafts, combined with a rod $G^{22}$ having a striker, and with a finger with which the said striker co-operates to open the spreaders at the proper time, substantially as described.

49. The arm $G^{14}$; the rock-shafts $G^{18}$ their attached spreaders, and the gears to connect the said rock-shafts, combined with a rod $G^{22}$ having a striker, and with a finger with which the said striker co-operates, and with a cam to actuate said finger, substantially as described.

50. The arm $G^{14}$, its attached funnel and bag-opener; and the sleeve $G'$ upon which the said arm is clamped, the said sleeve having an arm $G^2$, combined with a stud G, a lever $G^7$, means to actuate said lever, and a connection between the said lever and said arm to actuate the arm $G^{14}$, substantially as described.

51. The slide $D^{10}$ provided with a roller or other stud; a cam to reciprocate said stud; an arm $D^{12}$ connected with said slide; an arm 16 supported by the arm $D^{12}$; a pasting device supported by the arm 16 and adapted to move through an arc of one hundred and eighty degrees to obtain the paste and present it upon the lower lip of the bag, combined with a guide-box to present a series of bags, and with a paste-box and roller therein, to operate substantially as described.

52. The slide $D^{10}$ provided with a roller or other stud; a cam to reciprocate said stud; an arm $D^{12}$ connected with said slide having an arm 16, and a stud $a^3$; a pasting device carried thereby; a paste-box; a roll; an arm $a^4$ mounted on the stud $a^3$ and provided with a spring-supported clamp, combined with the guide-box having a pile of bags mounted therein, substantially as described.

53. In a machine for filling bags the following instrumentalities, viz;—a guide-box to receive a series of bags; a bag-opener; devices to move said bag-opener and cause it to enter the mouth of the endmost bag of the series and remove it from said guide-box; a bed located below and at the end of said box; a folding blade to impinge a part of the bag against said bed; and a device to act against the lip at the end of the bag and lay the same over upon the body of the bag, substantially as described.

54. A guide-box to receive a series of bags; a bag-opener; devices to move said bag-opener and cause it to enter the open mouth of the endmost bag of the series and remove it from the guide-box; a device to remove the bag from said bag-opener; a bed located below and at the end of said box; a folding blade to impinge a part of the bag against said bed; and a device to act against the lip at the end of the bag and lay the same over upon the folding-blade, and upon the body of the bag, substantially as described.

55. In a bag-filling machine, a rotating hopper provided with pockets; a chute $h'$ located therein; a measuring device; and a funnel, combined with means to move the said measuring device from below the said chute into the said funnel, substantially as described.

56. A rotating hopper having pockets; a funnel located near the said hopper, combined with a measuring device, and means to actuate it to carry material from the hopper into the funnel, substantially as described.

57. A rotating hopper having pockets; a measuring device; a reciprocating rod to which it is pivoted; and a funnel, combined with means for moving the said measuring device from the hopper, into the funnel, substantially as described.

58. In a bag filling machine, a reciprocating measuring device having its bottom pivoted thereto at one end and notched at its free end, combined with a worm mounted in said notch at the end of the bottom, and a worm-toothed rack engaged by the teeth of the worm, the rotation of the latter effecting the adjustment of the bottom, substantially as and for the purpose described.

59. In a bag filling machine, the following instrumentalities, viz:—a rotatable hopper having a series of buckets; a funnel; a rod $h^7$; means to reciprocate said rod; and a measuring device connected thereto, said measuring device after receiving material from the bucket being moved toward and discharging its contents into the funnel, for the purposes set forth.

60. In a bag-filling machine, a reciprocating rod $h^7$, combined with a measuring device pivoted at or near one end of the said rod, means to reciprocate said rod, a funnel, and means for tilting the pivoted measuring device as it enters the funnel, to operate substantially as described.

61. In a bag-filling machine, a folding bed, combined with a folding blade, a lip turning roll, and a clamp to clamp the bag upon the folding bed, to operate, substantially as described.

62. In a bag filling machine, a measuring device, a rotating hopper having lifting devices to lift and discharge material into the measuring device, and means to reciprocate the measuring device, combined with a scraper to scrape or even the material with the top of the measuring device the material dropping back into the hopper, substantially as described.

63. In a bag-filling machine, a rotating hopper having lifting devices to lift and discharge material into the measuring device a measuring device having its bottom pivoted at one end and made adjustable in the said measuring device to provide for more or less material, substantially as described.

64. In a rotating hopper having pockets; a curb $h^{15}$; and a feed chute $h^{17}$ in connection therewith, combined with a measuring device, a funnel, and means to actuate the measuring device to supply the funnel, substantially as described.

65. A rotating hopper having a curb $h^{15}$; a feed chute $h^{17}$ in connection with the said curb; an auxiliary chute $h^{20}$; a gate between the said auxiliary chute and feed chute, combined with a movable dam, a foot located in the said hopper and adapted to bear upon material therein, and intermediate devices to actuate the said dam, as and for the purpose set forth.

66. The feed chute $h^{17}$, and the auxiliary chute $h^{20}$, combined with a movable dam located in the feed chute $h^{17}$, the said dam being adapted to be raised and lowered to control the flow of the material from the auxiliary chute into the feed chute, substantially as described.

67. In a bag-filling machine, a yielding folding-bed; a folding-blade or device to contact with a bag on the said folding-bed, combined with a lip-turning device adapted to travel over the surface of the said folding-bed, substantially as described.

68. A rotating hopper having pockets; a measuring device; a reciprocating rod to which it is pivoted; a track for the measuring device; and a funnel, combined with means for moving the said measuring device from the hopper into the funnel, substantially as described.

69. A bag-carrier to take a pasted bag and put it into position for folding; and means to actuate the bag-carrier, combined with a folding-bed, and with catches for moving aside the lower end of the bag out of the way of the rising carrier, substantially as described.

70. In a bag-filling mechanism, the carriage $A^{13}$ having the folding-bed; a folding-blade a lip-turning device; and a rocker having arms to actuate the said lip-turning device, combined with means to reciprocate said carriage, and with devices to control the throw of the lip-turner to cause it to travel a longer or shorter distance on the folding-bed as desired, substantially as described.

71. A rotating hopper having a curb $h^{15}$; a feed chute $h^{17}$ in connection with the said curb; an auxiliary chute $h^{20}$; combined with a movable dam, a foot located in the said hopper and adapted to bear upon material therein, and intermediate devices to actuate the said dam, as and for the purpose set forth.

72. A guide-box to receive a pile of bags, and a foot adapted to slide therein, combined with a link in operative connection with said foot, a follower pivoted on said link, an arm extended backwardly from said follower, and a spring to tip the upper end of the follower forward, substantially as described.

73. The rotating hopper; a measuring device; and the stationary plate $m^4$ having a flange 49 and an opening 48, combined with a funnel into which the measuring device enters to discharge its contents, the said flange insuring the return into the hopper of any material discharged from the measuring device and which does not get properly into the funnel, substantially as described.

74. In a machine for filling bags, the following instrumentalities, viz:—a measuring device; a clutch to control the time of its movement; means to support a bag to be filled; and a feeler mechanism, which, in the absence of a bag to be filled, effects the release of the clutch and stops the movement of the measuring device, substantially as described.

75. In a machine for filling bags the following instrumentalities, viz;—the hopper, a co-operating measuring device; and a funnel to receive material from the hopper; a flexible bag-opening device; and a pasting or gumming mechanism to paste or gum the bag preparatory to closing the same, substantially as described.

76. In a bag filling machine, a guide-box to contain a series of bags to be filled; a folding blade a bed located below and at the end of said box, and provided with an elastic covering; combined with a roll; devices to actuate said roll and keep it pressed toward the said bed and to cause the roll to travel over the said bed, substantially as described.

77. In a bag filling machine, a guide-box to receive a series of bags to be filled; a bed located below and at the end of the bag-holding guide-box; and a roll; and actuating devices to move said roll over said bed; combined with a folding blade having an upturned lip at its front end to co-operate with the said roll and bed, substantially as described.

78. A bag presenting mechanism, including a movable guide-box to hold and present a bag to be filled; and pasting mechanism adapted to apply paste to the endmost bag of the series of bags in the guide-box; and folding devices to fold the bag transversely; combined with a bag-detainer adapted to hold the bag while being folded, substantially as described.

79. The guide box; a folding bed located below the end thereof; a co-operating folding roll; a rock-shaft having bearing arms in which the journals of the said roll are free to slide, and a folding blade, combined with springs to keep the said roll pressed normally toward the said bed, whereby the roll is caused to follow the surface of the said bed when traveling upon it, substantially as described.

80. Bag presenting mechanism to present a bag to be filled, a bag spreading device composed of arms adapted to be pressed into the open end of the bag, and devices to spread said arms in the direction of the width of the bag to hold the latter open while the bag is being filled, substantially as described.

81. A hopper rotatable in a substantially vertical plane and provided with a series of buckets; a chute leading into said hopper; and a dam co-operating with said chute; combined with a foot located in the said hopper and moved by the material therein to control the said dam and determine the quantity of material to enter the hopper from the chute, substantially as described.

In testimony whereof I have signed my name to this specification in the presence of two subscribing witnesses.

HENRY H. CUMMINGS.

Witnesses:
GEO. W. GREGORY,
GEO. F. RAUDLETT.